United States Patent
Furutani et al.

(10) Patent No.: US 10,603,857 B2
(45) Date of Patent: Mar. 31, 2020

(54) TREAD MOLD AND METHOD FOR REPAIR THEREOF

(71) Applicant: TOYO TIRE & RUBBER CO., LTD., Itami-shi, Hyogo (JP)

(72) Inventors: Hiroyuki Furutani, Itami (JP); Shouta Satou, Itami (JP)

(73) Assignee: Toyo Tire Corporation, Itami-shi (JP)

( * ) Notice: Subject to any disclaimer, the term of this patent is extended or adjusted under 35 U.S.C. 154(b) by 0 days.

(21) Appl. No.: 16/209,424

(22) Filed: Dec. 4, 2018

(65) Prior Publication Data
US 2019/0184661 A1 Jun. 20, 2019

(30) Foreign Application Priority Data
Dec. 15, 2017 (JP) ................................. 2017-240919

(51) Int. Cl.
*B29D 30/06* (2006.01)

(52) U.S. Cl.
CPC .. *B29D 30/0629* (2013.01); *B29D 2030/0607* (2013.01); *B29D 2030/0663* (2013.01)

(58) Field of Classification Search
CPC ........ B29D 30/0629; B29D 2030/0607; B29D 2030/0663
See application file for complete search history.

(56) References Cited

U.S. PATENT DOCUMENTS

| | | | |
|---|---|---|---|
| 3,741,696 A * | 6/1973 | Greenwood ....... | B29D 30/0629 425/47 |
| 3,901,632 A * | 8/1975 | Prosdocimi ........ | B29D 30/0629 425/47 |
| 5,234,326 A * | 8/1993 | Galli ....................... | B29C 33/10 425/46 |
| 5,290,163 A * | 3/1994 | Katsumata ......... | B29D 30/0629 425/183 |
| 5,585,064 A * | 12/1996 | Moris-Herbeuval ....................... | B29C 33/0038 264/501 |
| 6,292,993 B1 * | 9/2001 | Ito ....................... | B29D 30/0629 29/426.1 |
| 9,969,138 B2 * | 5/2018 | Villeneuve ............ | B29C 33/306 |
| 2002/0176792 A1 * | 11/2002 | Tuttle .................... | B22F 3/1283 419/8 |
| 2007/0248707 A1 * | 10/2007 | Ohara ................. | B29D 30/0629 425/28.1 |
| 2013/0099419 A1 * | 4/2013 | Sehm .................. | B29D 30/0629 264/326 |
| 2014/0377392 A1 * | 12/2014 | Yaguchi ............. | B29D 30/0629 425/47 |

FOREIGN PATENT DOCUMENTS

JP          7-314459 A      12/1995

* cited by examiner

*Primary Examiner* — James P Mackey
(74) *Attorney, Agent, or Firm* — Westerman, Hattori, Daniels & Adrian, LLP (57) ABSTRACT

A tread mold includes a securable region at an outer circumferential portion thereof which is capable of being secured to a jig at a machining apparatus, and a positioning surface at the outer circumferential portion thereof which is capable of making surface contact with a reference surface at the jig so as to permit positioning to be carried out relative to the jig, the positioning surface is arranged so as to face in the tire circumferential direction so as to permit the tread mold to be positioned relative to the jig in the tire circumferential direction.

8 Claims, 9 Drawing Sheets

TREAD MOLD AND METHOD FOR REPAIR THEREOF

CROSS REFERENCE TO RELATED APPLICATIONS

This application claims the benefit of priority of Japanese application no. 2017-240919, filed on Dec. 15, 2017, which is incorporated herein by reference.

BACKGROUND OF THE INVENTION

Field of the Invention

The present invention relates to a tread mold having an inner circumferential portion that comes in contact with a tread region of a tire when in a closed mold state, and to a method for repair thereof.

Description of the Related Art

Conventionally known as a tire mold is a tread mold having an inner circumferential portion that comes in contact with a tread region of a tire when in a closed mold state (e.g., JP H7-314459 A). In addition, because the tread mold comes in mutual contact with other mold(s) when in the closed mold state, repeated alternation between the closed mold state and the open mold state gradually causes wear to occur.

In addition, when wear has progressed, to return the tread mold to its original state, it is necessary to use a machining apparatus to machine the tread mold. However, if the tread mold cannot be secured in the proper position relative to the jig of the machining apparatus, it will not be possible to properly restore the tread mold to its original shape.

For example, the dimension in the tire circumferential direction of the tread mold will be respectively different for different tread molds; furthermore, occurrence of wear, for example, at the ends in the tire circumferential direction of the tread mold will cause the dimension in the tire circumferential direction of the tread mold to change. As a result, it can be difficult to carry out positioning in the tire circumferential direction of a plurality of tread molds relative to a single common jig.

SUMMARY OF THE INVENTION

The problem is therefore to provide a tread mold capable of being secured in the proper position relative to the jig of the machining apparatus, and a method for repair thereof.

There is provided a tread mold that is one among a plurality thereof which may be arrayed in annular fashion in a tire circumferential direction so that an inner circumferential portion thereof is capable of coming in contact with a tread region of a tire to form a closed space at the interior thereof for molding the tire when in a closed mold state, the tread mold comprises a securable region at an outer circumferential portion thereof which is capable of being secured to a jig at a machining apparatus; and a positioning surface at the outer circumferential portion thereof which is capable of making surface contact with a reference surface at the jig so as to permit positioning to be carried out relative to the jig;

wherein the positioning surface is arranged so as to face in the tire circumferential direction so as to permit the tread mold to be positioned relative to the jig in the tire circumferential direction.

Further, the tread mold may further comprise:

a recess at the outer circumferential portion; and the positioning surface is arranged at an inner surface of the recess.

Further, the tread mold may further comprise:

a plurality of air holes extending from openings at the inner circumferential portion to openings at the outer circumferential portion; and all of the openings at the outer circumferential portion are arranged in such fashion as to be separated from the positioning surface.

Further, the tread mold may further comprise:

a plurality of air holes extending from openings at the inner circumferential portion to openings at the outer circumferential portion; and all of the openings at the outer circumferential portion are arranged in such fashion as to be separated from the inner surface of the recess.

Further, the tread mold may have a configuration in which:

surface roughness of the positioning surface is less than surface roughnesses at locations other than the positioning surface at the inner surface of the recess.

Further, the tread mold may have a configuration in which: the positioning surface is planar.

Further, the tread mold may further comprise:

joint regions capable of coming in contact with adjacent tread molds when in the closed mold state, at either end thereof in the tire circumferential direction; and the respective joint regions have irregular surfaces.

Further, there is provided a tread mold repair method comprises:

preparing the tread mold according to claim 1 wherein provided, at either end thereof in the tire circumferential direction, there are joint regions capable of coming in contact with adjacent tread molds when in the closed mold state;

causing metal to be built up at the joint regions of the tread mold;

causing the tread mold to be secured to the jig in such fashion that the positioning surface of the tread mold is in contact with the reference surface at the jig; and machining the joint regions of the tread mold using data pertaining to an original shape of the tread mold.

DETAILED DESCRIPTION OF THE INVENTION

Below, an embodiment of a tread mold is described with reference to FIG. 1 through FIG. 16. At the respective drawings (and the same is true for FIG. 17 and FIG. 18), note that dimensional ratios at the drawings and actual dimensional ratios are not necessarily consistent, and note further that dimensional ratios are not necessarily consistent from drawing to drawing.

First, before describing the constitution of a tread mold, a pneumatic tire (hereinafter sometimes referred to as simply "tire") such as might be molded using a tire molding device that is provided with a tread mold will be described with reference to FIG. 1.

Figure 1:
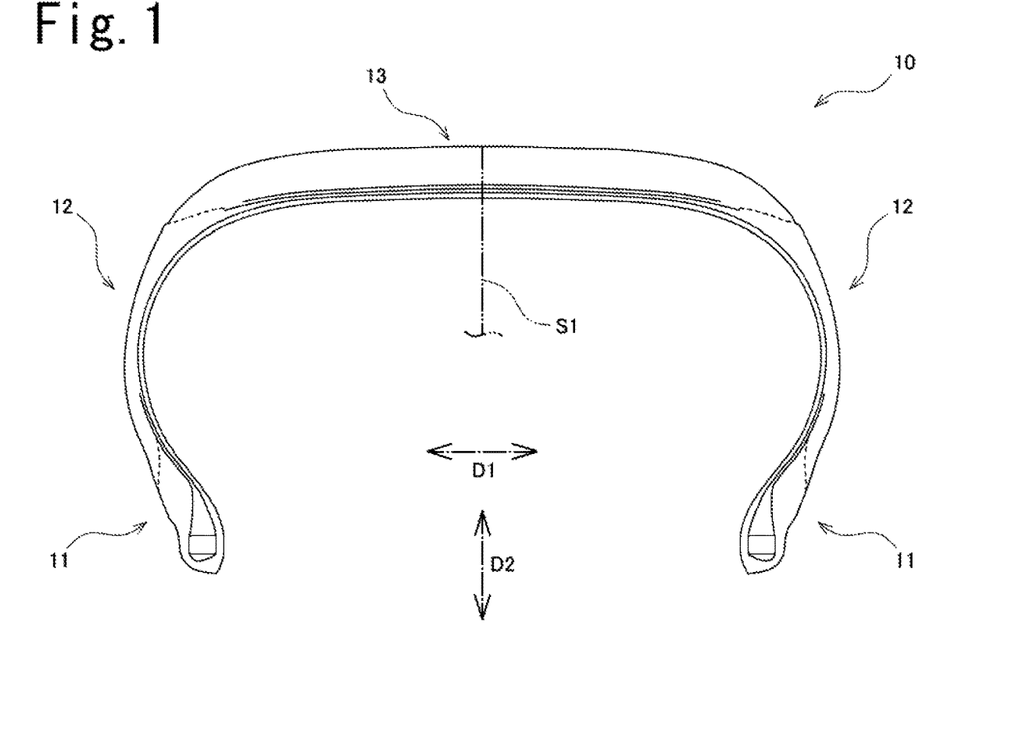
FIG. 1 is a view of a section, taken along a tire meridional plane, of the principal components in a pneumatic tire such as might be molded using a tire molding device that is provided with a tread mold associated with the present embodiment.
Figure 2:
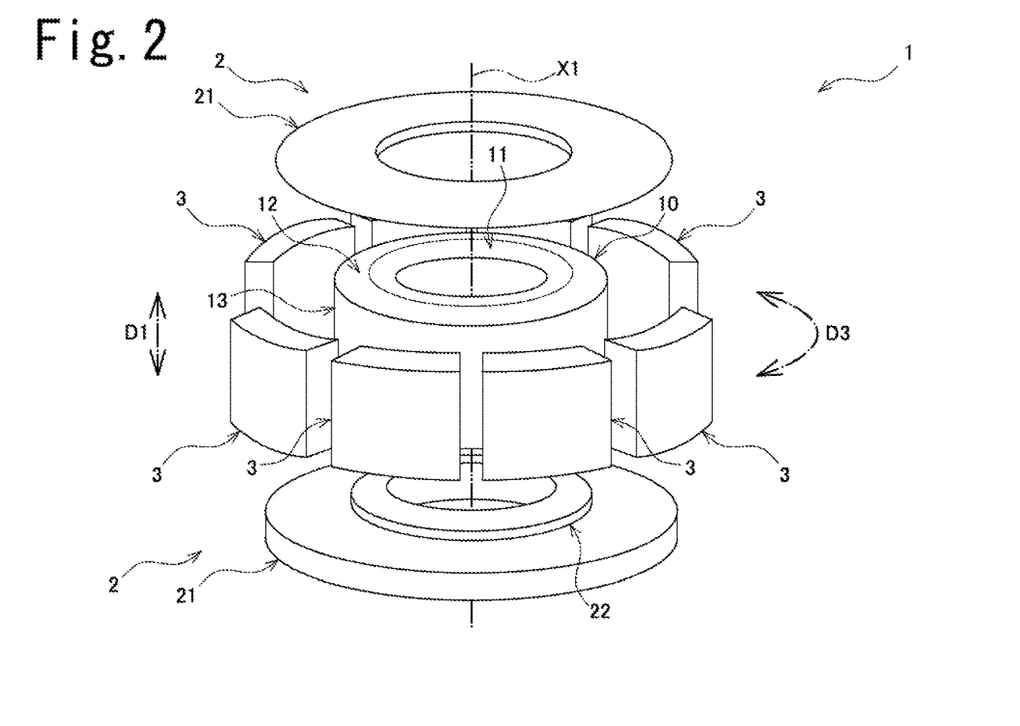
FIG. 2 is a schematic diagram showing an open mold state at a tire molding device that is provided with a tread mold associated with same embodiment.
Figure 3:
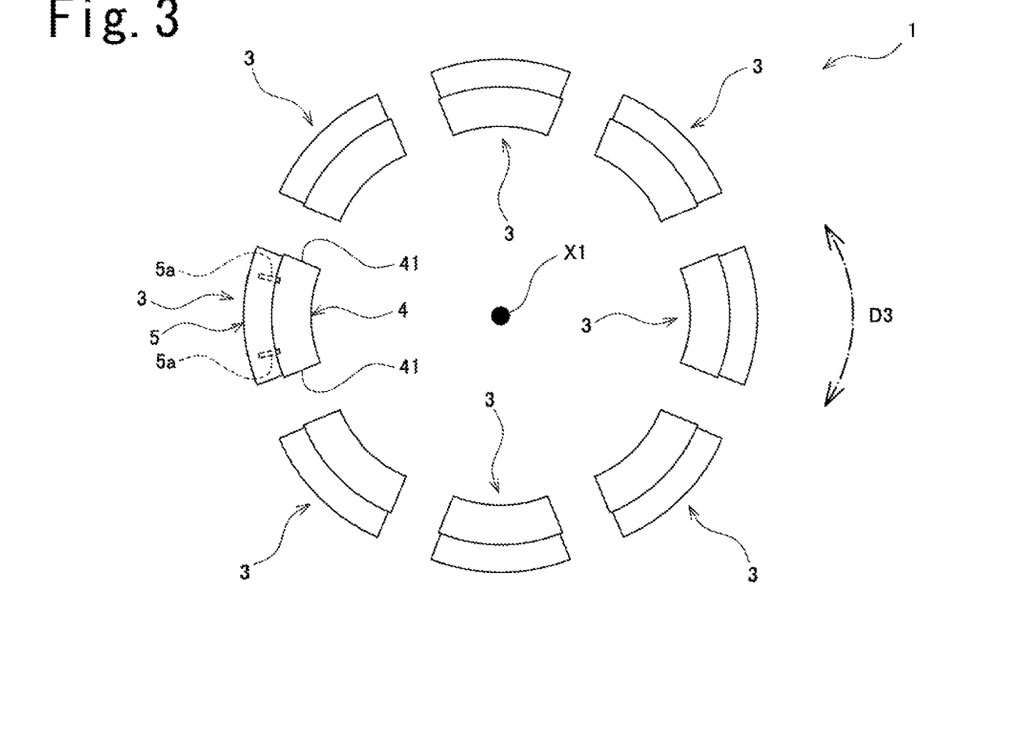
FIG. 3 is a plan view of the principal components in a drawing showing an open mold state at a tire molding device that is provided with a tread mold associated with same embodiment.
Figure 4:
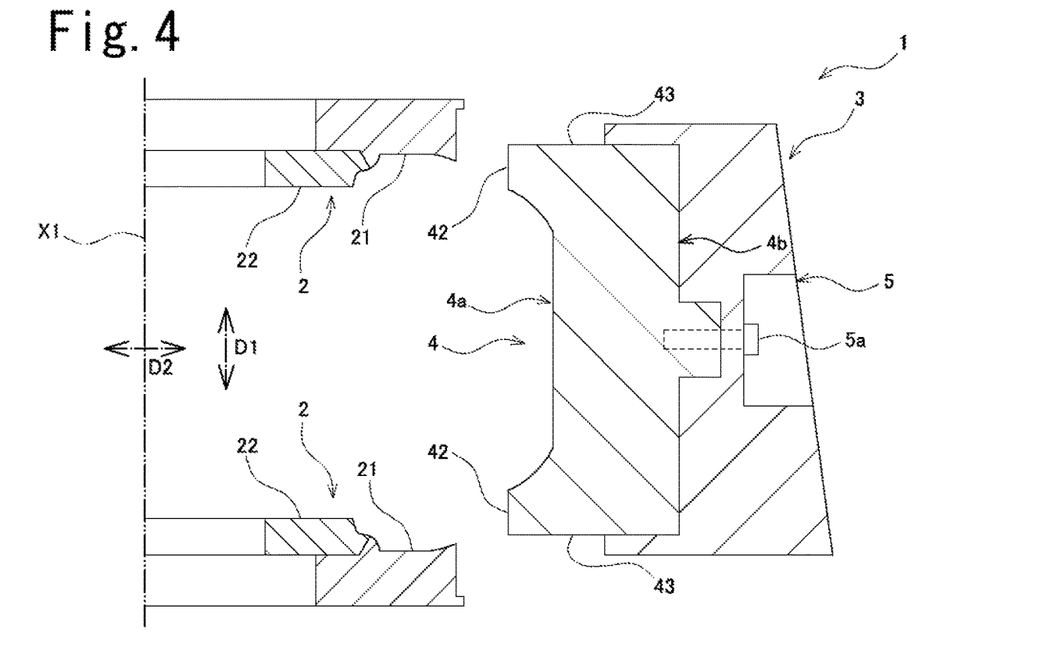
FIG. 4 is a view of a section, taken along a tire meridional plane, of the principal components in a drawing showing the situation that exists at FIG. 3.
Figure 5:
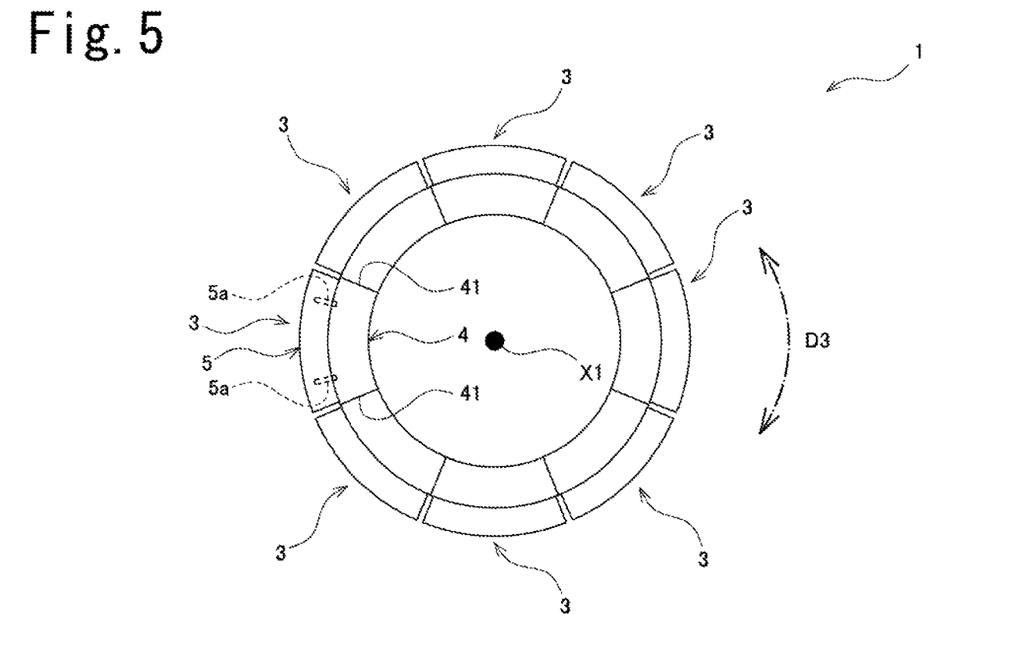
FIG. 5 is a plan view of the principal components in a drawing showing a closed mold state at a tire molding device that is provided with a tread mold associated with same embodiment.
Figure 6:
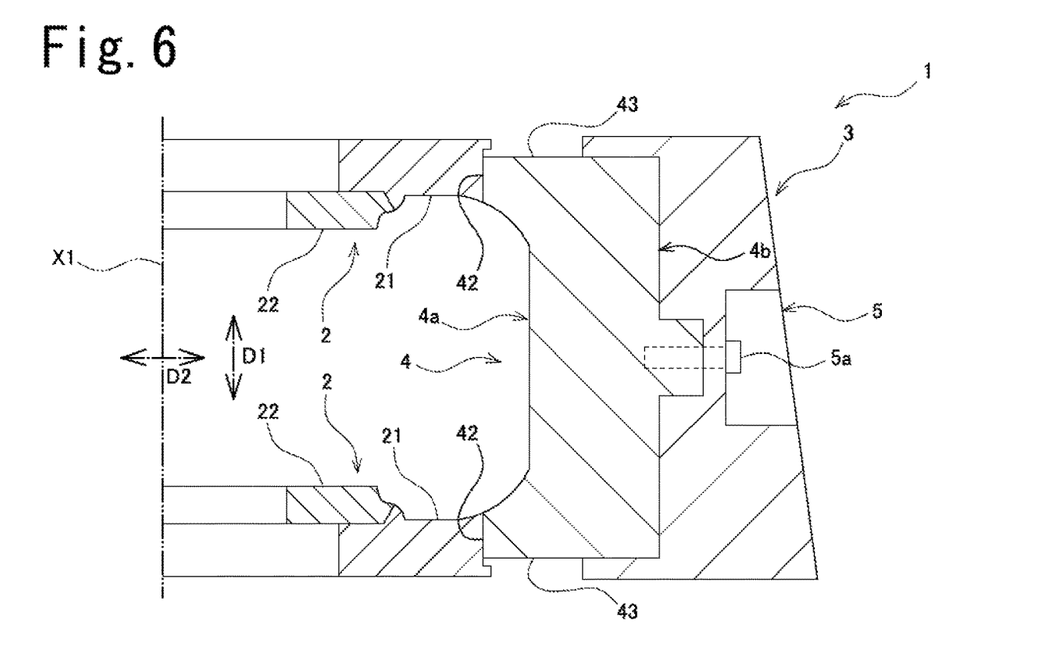
FIG. 6 is a view of a section, taken along a tire meridional plane, of the principal components in a drawing showing the situation that exists at FIG. 5.
Figure 7:
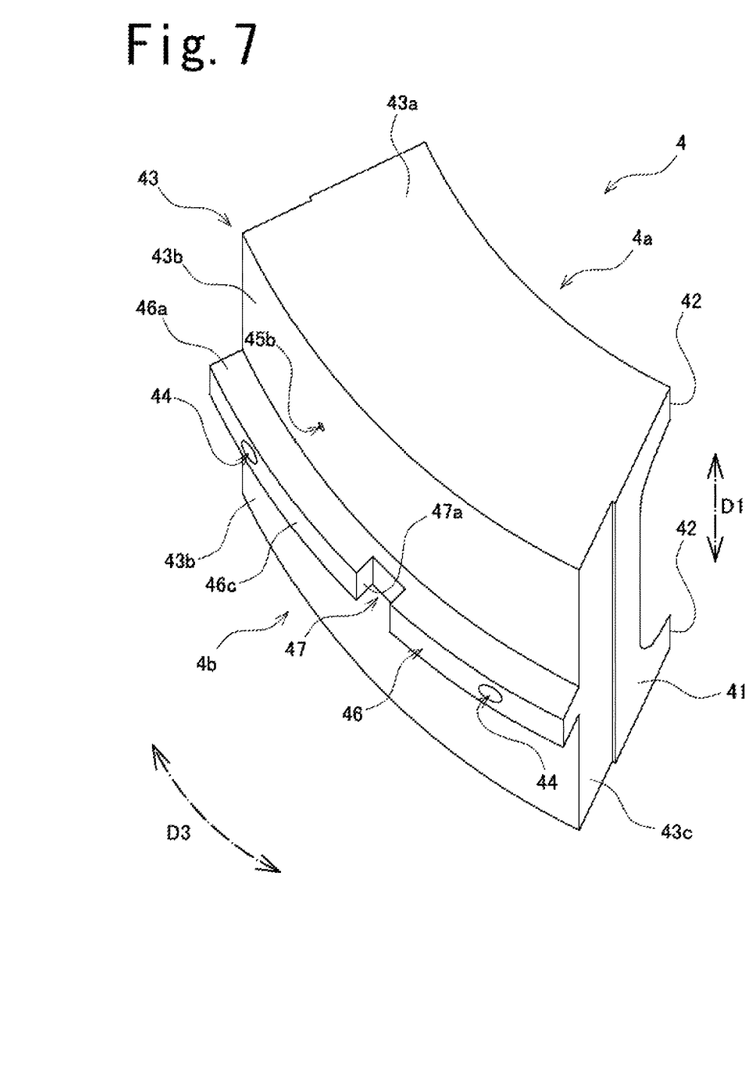
FIG. 7 is a general perspective view of a tread mold associated with same embodiment.
Figure 8:
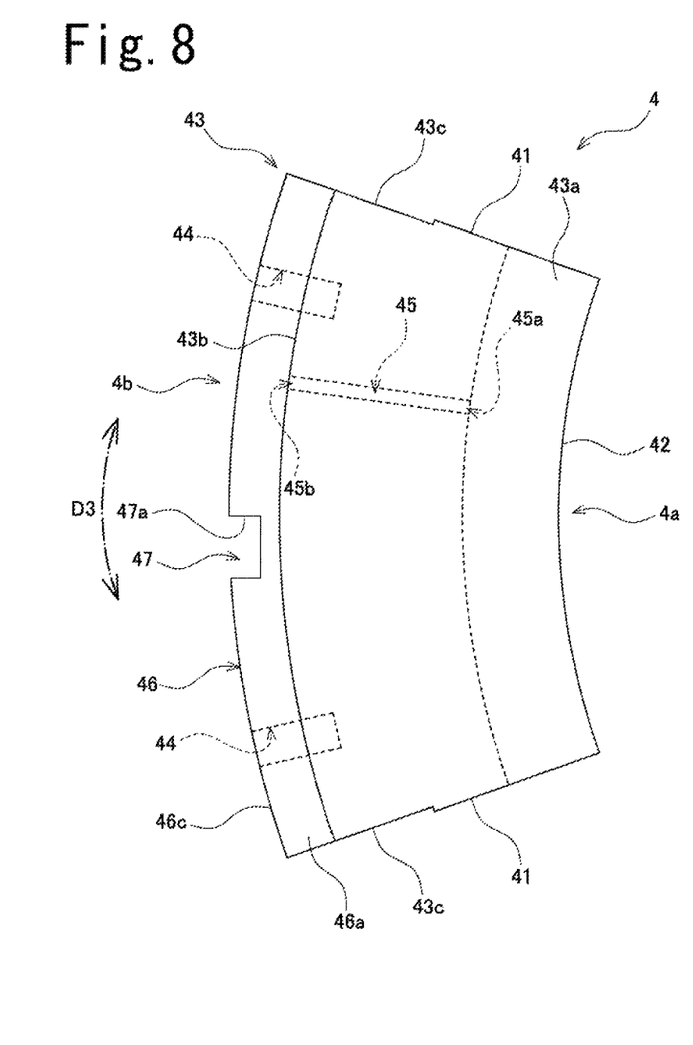
FIG. 8 is a general plan view of a tread mold associated with same embodiment.
Figure 9:
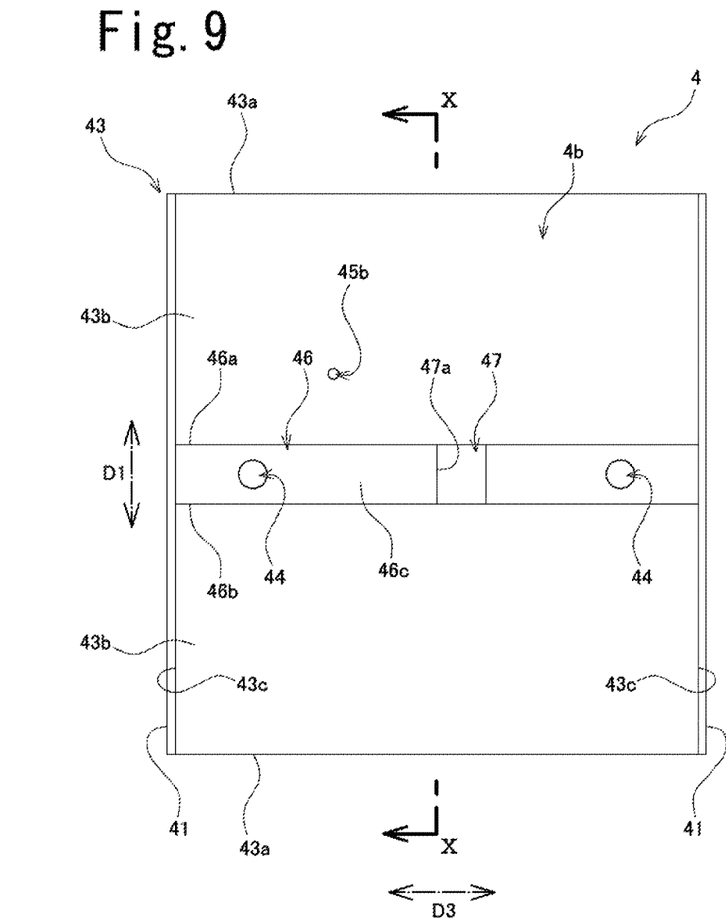
FIG. 9 is a general side view of a tread mold associated with same embodiment.
Figure 10:
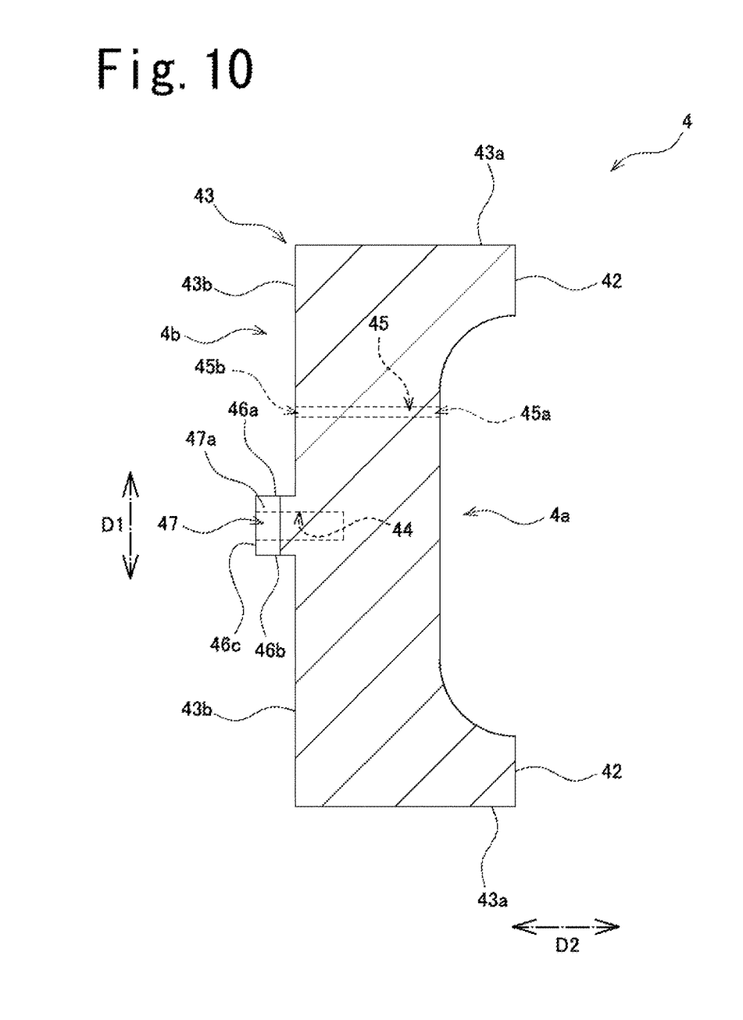
FIG. 10 is a view of a section taken along X-X in FIG. 9.
Figure 11:
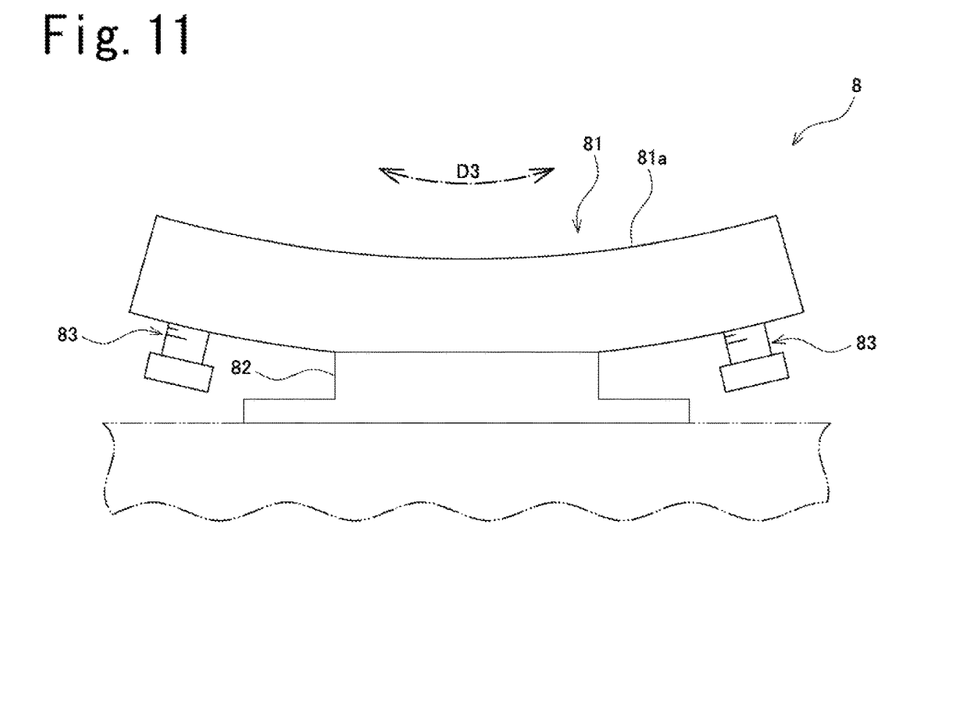
FIG. 11 is a general front view of a jig for securing a tread mold associated with same embodiment.
Figure 12:
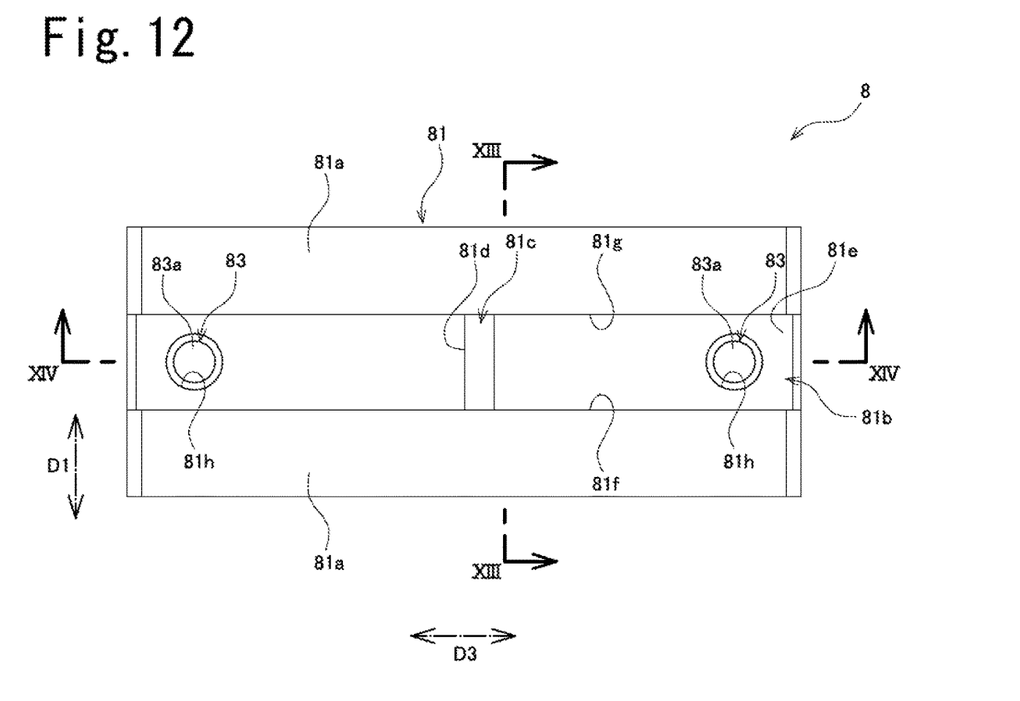
FIG. 12 is a general plan view of a jig for securing a tread mold associated with same embodiment.
Figure 13:
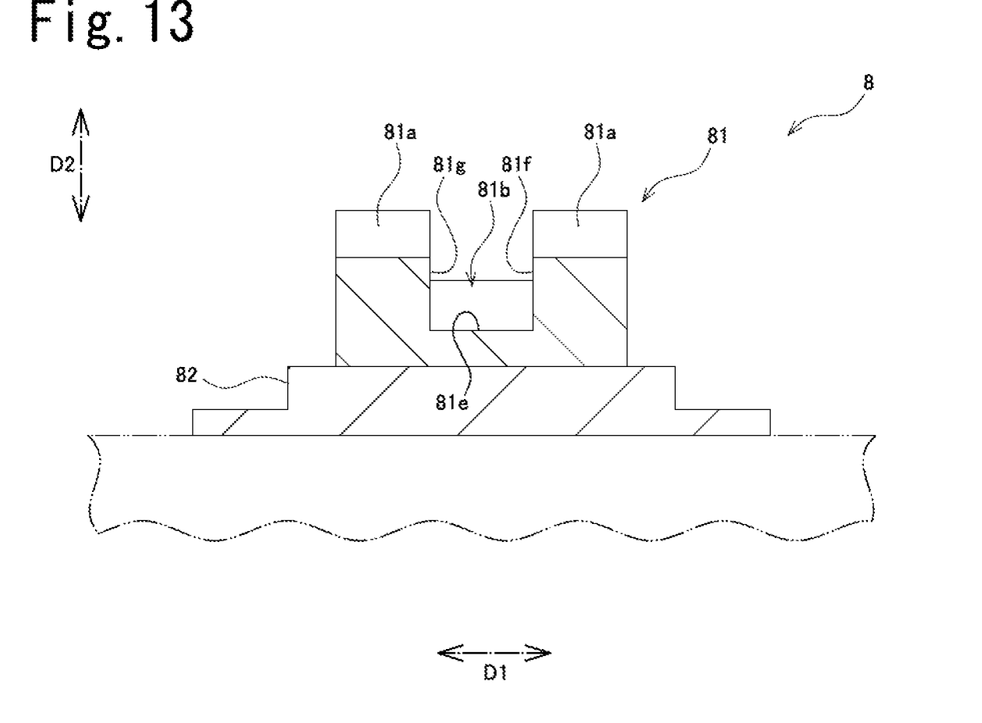
FIG. 13 is a view of a section taken along XIII-XIII in FIG. 12.
Figure 14:
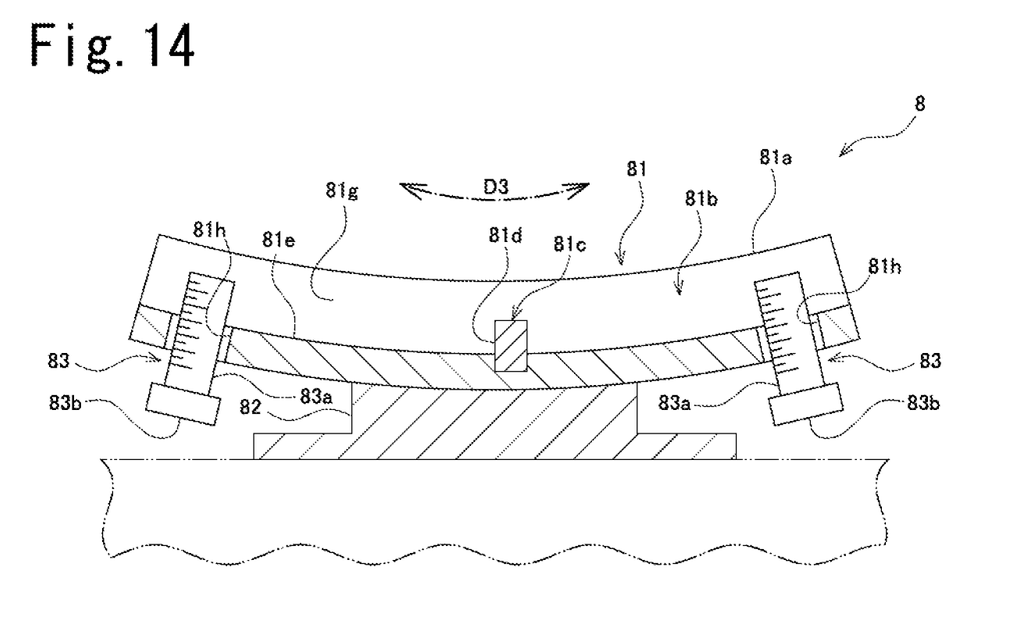
FIG. 14 is a view of a section taken along XIV-XIV in FIG. 12.

As shown in FIG. 1, tire 10 is provided with a pair of bead regions 11 at which beads are present; sidewall regions 12 which extend outwardly in the tire radial direction D2 from the respective bead regions 11; and tread region 13 which is contiguous with the outer ends in the tire radial direction D2 of the pair of sidewall regions 12. In addition, tread region 13 is provided, at an outer face thereof in the tire radial direction D2, with a tread surface that comes in contact with the road surface.

At the respective drawings, note that first direction D1 is the tire width direction D1 which is parallel to tire rotational axis X1 which is the axis of rotation of tire 10, second direction D2 is the tire radial direction D2 which is the direction of the diameter of tire 10, and third direction D3 is the tire circumferential direction D3 which is the direction that is circumferential about tire rotational axis X1. Furthermore, tire equatorial plane S1 is a plane that is located centrally in the tire width direction D1 of tire 10 and that is perpendicular to tire rotational axis X1, and tire meridional planes are planes that are perpendicular to tire equatorial plane S1 and that contain tire rotational axis X1.

Next, a tire molding device that is provided with a tread mold will be described with reference to FIG. 2 through FIG. 6. Note that directions (tire width direction D1, tire radial direction D2, and tire circumferential direction D3) pertaining to tire 10 molded using tire molding device 1 will be used as directions D1 through D3 pertaining to the tire molding device.

As shown in FIG. 2 through FIG. 6, tire molding device 1 is provided with a pair of side plates 2 that are separated in the tire width direction D1, and a plurality of sectors 3 that are arrayed along the tire circumferential direction D3. Tire molding device 1 is a tire vulcanizing device for carrying out vulcanization of an unvulcanized tire to produce a molded vulcanized tire.

Furthermore, side plate 2 is provided with side mold 21, a portion toward the interior in the tire width direction D1 of which comes in contact with sidewall region 12 of tire 10. Furthermore, side plate 2 is provided with bead mold 22, which engages with bead region 11 of tire 10.

Sector 3 is provided with tread mold 4, an inner circumferential portion 4a (portion toward the interior in the tire radial direction D2) of which comes in contact with tread region 13 of tire 10; and mold base 5, mounted to which toward the interior thereof in the tire radial direction D2 is tread mold 4 and which together with tread mold 4 forms an integral body that moves in the tire radial direction D2. Note that tread mold 4 is secured to mold base 5 by means of securing fixture(s) 5a.

The pair of side molds 21, 21 are arranged so as to be separated in the tire width direction D1 from tire 10 which is placed in the interior of tire molding device 1. Furthermore, the plurality of tread molds 4, which are arranged toward the exterior in the tire radial direction D2 from the pair of side molds 21, 21, are arrayed in annular fashion in the tire circumferential direction D3 about tire 10 which is placed in the interior of tire molding device 1.

In addition, one side mold 21 is capable of moving in the tire width direction D1 with respect to the other side mold 21, and the plurality of tread molds 4 are capable of moving in the tire radial direction D2 with respect to side molds 21. As a result, tire molding device 1 is capable of being switched between an open mold state such as that shown in FIG. 2 through FIG. 4 and a closed mold state such as that shown in FIG. 5 and FIG. 6.

When tire molding device 1 is in its open mold state, because side molds 21 and tread molds 4 are separated, insertion and removal of tire 10 are made possible. Furthermore, when tire molding device 1 is in its closed mold state, because side molds 21 and tread molds 4 come in contact in such fashion that a load acts therebetween, a closed space (cabinet) for molding of tire 10 is formed at the interior thereof.

Tread mold 4 is provided, at either end thereof in the tire circumferential direction D3, with first joint regions 41 which come in contact with adjacent tread molds 4 when in the closed mold state; and is provided, at either end thereof in the tire width direction D1 at inner circumferential portion 4a, with second joint regions 42 which come in contact with side molds 21 when in the closed mold state. Furthermore, tread mold 4 is provided, at either end thereof in the tire width direction D1, with nonjoint regions 43 which are always separated from other molds 21, 22, 4 throughout the time when in the open mold state and throughout the time when in the closed mold state.

As shown in FIG. 7 through FIG. 10, nonjoint region 43 is provided with planar width end faces 43a which are arranged at either end in the tire width direction D1 of tread mold 4; curved (more specifically, convexly curved) outer circumferential face 43b which is arranged at an end in the tire radial direction D2 of tread mold 4; and planar circumferential end faces 43c which are arranged at either end in the tire circumferential direction D3 of tread mold 4. Note that circumferential end face 43c is arranged in such fashion as to cause formation of a step in combination with first joint region 41.

Tread mold 4 is provided with securable region(s) 44 to which securing fixture(s) 5a (see FIG. 3 through FIG. 6) are secured at outer circumferential portion 4b. In accordance with the present embodiment, securing fixtures 5a are male threaded members (e.g., bolts), and securable regions 44 are female threaded regions. Note, however, that securable regions 44 are not limited to such constitution, it being sufficient, e.g., where securing fixtures 5a are other than male threaded members, for a constitution such as will accommodate securing fixtures 5a to be employed thereat.

Tread mold 4 is provided with a plurality of air holes 45, which extend from openings 45a at inner circumferential portion 4a to openings 45b at outer circumferential portion 4b, for causing air at the interior to be vented to the exterior. Whereas only a single air hole 45 is shown at FIG. 7 through FIG. 10, a plurality (e.g., 100 or more) thereof would in actuality be provided. Furthermore, with regard to the direction in which air holes 45 extend, this might, for example, be the tire radial direction D2 or a direction normal to the inner circumferential surface of tread mold 4.

Tread mold 4 is provided at outer circumferential portion 4b with projection 46 which projects so as to extend in the tire circumferential direction D3 from outer circumferential face 43b. In addition, tread mold 4 is secured in such fashion as to be positioned with respect to mold base 5 by virtue of the fact that end faces 46a, 46b (hereinafter also referred to as "width direction end faces") which face in the tire width direction D1 at projection 46 are straddled by mold base 5.

Note that width direction end faces 46a, 46b of projection 46 are formed in planar fashion. Furthermore, end face 46c (hereinafter also referred to as "radial direction end face") which faces the exterior in the tire radial direction D2 at projection 46 is formed in curved (more specifically, convexly curved) fashion.

Furthermore, tread mold 4 is provided at outer circumferential portion 4b with recess 47. In accordance with the present embodiment, recess 47 is arranged at a location partway along the tire circumferential direction D3 at projection 46. Note that when tread mold 4 is secured to mold base 5 by means of securing fixture(s) 5a, the inner surface of recess 47 does not come in contact with mold base 5 but is separated from mold base 5.

Next, jig 8 for securing tread mold 4 at a time when tread mold 4 is to be machined by a machining apparatus will be described with reference to FIG. 11 through FIG. 14.

As shown in FIG. 11 through FIG. 14, jig 8 is provided with retaining portion 81 which retains outer circumferential portion 4b of tread mold 4 (see FIG. 7 through FIG. 10), and base portion 82 which secures retaining portion 81 to the machining apparatus. Furthermore, jig 8 is provided with jig securing fixture(s) 83 which cause tread mold 4 to be secured to retaining portion 81.

Retaining portion 81 is provided with concavely curved support surface 81a which accommodates outer circumferential portion 4b (more specifically, outer circumferential face 43b) of tread mold 4. In addition, retaining portion 81 is provided with groove 81b which is recessed relative to support surface 81a and which is for permitting insertion of projection 46 of tread mold 4 thereinto. Moreover, groove 81b of retaining portion 81 is provided with protrusion 81c which is inserted into recess 47 of tread mold 4, a side face of protrusion 81c serving as reference surface 81d which is centrally located at jig 8. In addition, reference surface 81d is planar.

Groove 81b is provided with bottom face 81e which is formed in concavely curved fashion and which accommodates the convex curvature with which radial direction end face 46c of projection 46 at tread mold 4 is formed. Furthermore, groove 81b is provided with side faces 81f, 81g which are formed in planar fashion and which accommodate the planarity with which width direction end faces 46a, 46b of projection 46 at tread mold 4 are formed.

Jig securing fixtures 83 being male threaded members (e.g., bolts) having threaded regions 83a, retaining portion 81 is provided with through-holes 81h into which threaded regions 83a of jig securing fixtures 83 may be inserted. In addition, tread mold 4 is secured to retaining portion 81 as a result of threaded engagement of jig securing fixture(s) 83 with securable region(s) 44 of tread mold 4. Note that through-hole 81h is larger than threaded region 83a of jig securing fixture 83 but is smaller than head 83b of jig securing fixture 83.

Whereas jig securing fixtures 83 of the present embodiment are such that male threaded members are employed to accommodate securable regions 44 which are female threaded regions, there is no limitation with respect to such constitution. In other words, it is sufficient that jig securing fixture 83 be such that member(s) which accommodate securable region 44 of tread mold 4 are employed.

Next, the principle by which tread mold 4 associated with the present embodiment is able to be secured in the proper position relative to jig 8 will be described.

Side mold 21 might, for example, be formed from iron, steel, stainless steel, or other such metal, and tread mold 4 might be formed from aluminum or other such metal that is softer than side mold 21. In addition, when in the closed mold state, tread mold 4 is joined by way of first joint region(s) 41 to adjacent tread mold(s) 4, and is joined by way of second joint region(s) 42 to side mold(s) 21. Thus, repeated alternation between the closed mold state and the open mold state gradually causes wear to occur at joint regions 41, 42.

At a tread mold 4 at which wear of joint regions 41, 42 has progressed, welding might, for example, be used to add metal to (build up) joint regions 41, 42, following which a machining apparatus (e.g., laser machining apparatus or milling machine) might be used to machine joint regions 41, 42 using data pertaining to the original shape thereof to restore it to its original shape. However, if tread mold 4 cannot be secured in the proper position relative to jig 8 of the machining apparatus, it will not be possible to properly restore tread mold 4 to its original shape.

Therefore, first, with respect to the tire width direction D1 of the tread mold 4, width end faces 43a, 43a at nonjoint region 43 which do not wear might, for example, be arranged at either end in the tire width direction D1 of tread mold 4, and/or width direction end faces 46a, 46b at projection 46 might, for example, be nonwearing parts. In addition, width end faces 43a and/or width direction end faces 46a, 46b might have the same shape and be at the same location at the respective tread molds 4.

Accordingly, by using width end faces 43a and/or width direction end faces 46a, 46b as references, it will be possible to position tread mold 4 relative to jig 8 in the tire width direction D1 of tread mold 4. As a result, it will be possible to identify the same position in the tire width direction D1 of tread mold 4 regardless of whether there has been occurrence of wear.

Figure 15:
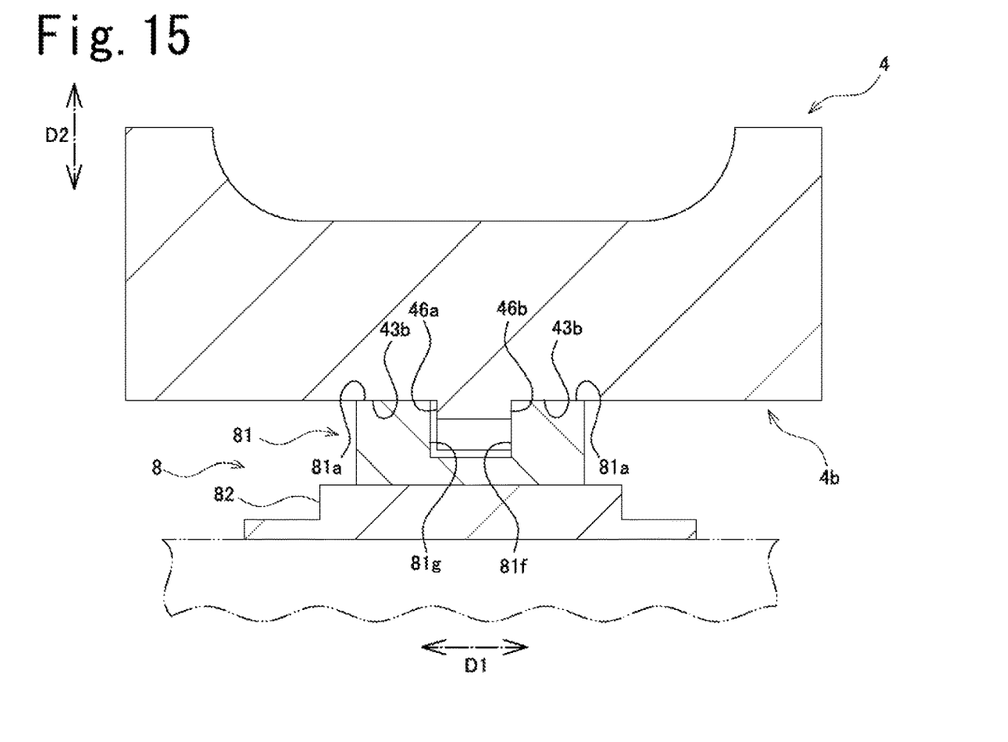
FIG. 15 is a sectional view showing how a tread mold associated with same embodiment might be secured to a jig.

As shown in FIG. 15, in accordance with the present embodiment, by causing one width direction end face 46b of projection 46 to make surface contact with one side face 81f of groove 81b of jig 8, positioning of tread mold 4 relative to jig 8 is carried out. Note that positioning of tread mold 4 relative to jig 8 may also be carried out by causing the other width direction end face 46a of projection 46 or width end face 43A to come in contact with jig 8.

Furthermore, with respect to the tire radial direction D2 of the tread mold 4, whereas second joint region 42 is arranged at inner circumferential portion 4a (portion toward the interior in the tire radial direction D2), outer circumferential face 43b at nonjoint region 43 which does not wear might, for example, be present at outer circumferential portion 4b (i.e., portion toward the exterior in the tire radial direction D2), and/or radial direction end face 46c at project ion 46 might, for example, be a nonwearing part. In addition, outer circumferential face 43b and/or radial direction end face 46c might have the same shape and be at the same location at the respective tread molds 4.

Accordingly, by using outer circumferential face 43b and/or radial direction end face 46c as reference(s), it will be possible to position tread mold 4 relative to jig 8 in the tire radial direction D2 of tread mold 4. As a result, it will be possible to identify the same position in the tire radial direction D2 of tread mold 4 regardless of whether there has been occurrence of wear.

Figure 16:
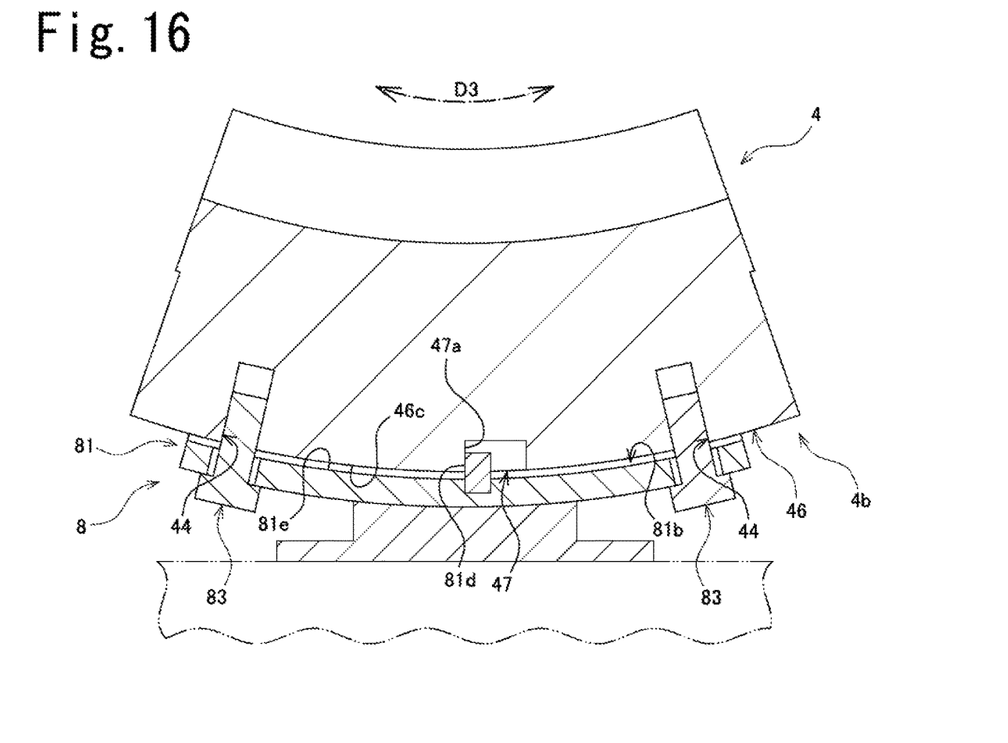
FIG. 16 is a sectional view showing how a tread mold associated with same embodiment might be secured to a jig.

As shown in FIG. 15 and FIG. 16, in accordance with the present embodiment, by causing outer circumferential face 43b to make surface contact with support surface 81a of jig 8, positioning of tread mold 4 relative to jig 8 is carried out. Note that positioning of tread mold 4 relative to jig 8 may also be carried out by causing radial direction end face 46c of projection 46 to come in contact with jig 8.

It should be noted that, at the tire circumferential direction D3 of tread mold 4, whereas first joint regions 41 are arranged at either end in the tire circumferential direction D3, circumferential end faces 43c of nonjoint region 43 which do not wear are arranged at the ends in the tire circumferential direction D3 of tread mold 4. However, because the dimensions in the tire circumferential direction D3 of tread molds 4 are respectively different, the locations of circumferential end faces 43c will be different for different tread molds 4.

As a result, with a single common jig 8, it will not be possible to use circumferential end face 43c as a reference to position tread mold 4 relative to the jig 8 in the tire circumferential direction D3 of tread mold 4. Accordingly, occurrence of wear at respective first joint regions 41 will make it impossible to identify the same position in the tire circumferential direction D3 of tread mold 4 regardless of whether there has been occurrence of wear.

As shown in FIG. 16, positioning surface 47a which makes surface contact with reference surface 81d of jig 8 is therefore provided at an inner surface of recess 47 at projection 46. In addition, to permit surface contact to be made with reference surface 81d of jig 8, positioning surface 47a of tread mold 4 is formed in planar fashion so as to accommodate the planarity with which reference surface 81d at jig 8 is formed. In accordance with the present embodiment, note that positioning surface 47a is arranged so as to be centrally located between a pair of securable regions 44, 44 in the tire circumferential direction D3.

In addition, positioning surface 47a is arranged so as to face the tire circumferential direction D3. As a result, when tread mold 4 is secured to jig 8 by jig securing fixture(s) 83, by causing positioning surface 47a of tread mold 4 to make surface contact with reference surface 81d of jig 8, positioning of tread mold 4 in the tire circumferential direction D3 relative to jig 8 is carried out. Accordingly, it will be possible to identify the same position in the tire circumferential direction D3 of tread mold 4 regardless of whether there has been occurrence of wear.

Thus, in each of the directions D1 through D3, positioning of tread mold 4 relative to jig 8 is carried out in such fashion that it is possible to identify the same position regardless of whether there has been occurrence of wear. Accordingly, because tread mold 4 is secured in the proper position relative to jig 8, following addition of metal to joint regions 41, 42, by causing a machining apparatus to machine joint regions 41, 42 using data pertaining to the original shape thereof, tread mold 4 can be restored it to its original shape in highly reproducible fashion.

Moreover, the surface roughness of positioning surface 47a might, for example, be made less than the surface roughnesses of all inner surfaces other than positioning surface 47a of recess 47. By so doing, because positioning surface 47a of tread mold 4 will make surface contact with reference surface 81d of jig 8 with good precision, this will make it possible to increase the precision with which positioning of tread mold 4 is carried out relative to jig 8. Note that surface roughness is the value measured in accordance with the method set forth at JIS B0601.

It should be noted that if the shape of positioning surface 47a were to change, because positioning surface 47a would no longer make surface contact with reference surface 81d of jig 8, this would make it impossible for positioning of tread mold 4 to be carried out relative to jig 8. Accordingly, it is necessary to suppress occurrence of situations that might cause the shape of positioning surface 47a to change.

Positioning surface 47a is therefore arranged at an inner surface of recess 47. By so doing, it is possible, e.g., during maintenance, inspection, servicing, or transport of tread mold 4, to suppress occurrence of situations in which other objects (e.g., tools, other parts of tire molding device 1, etc.) come in contact with positioning surface 47a. This will make it possible to suppress occurrence of situations that might cause the shape of positioning surface 47a to change.

Furthermore, during maintenance and inspection of tread mold 4, cleaning operations might be carried out, e.g., for removal of debris adhering to openings 45a, 45b of air holes 45. Openings 45b at outer circumferential portion 4b for all air holes 45 are therefore arranged in such fashion as to be separated from positioning surface 47a. That is, opening 45b of air holes 45 are not arranged on positioning surface 47a.

By so doing, because it will be possible to prevent a procedure from being carried out at positioning surface 47a when the procedure for cleaning of air holes 45 is carried out, this will make it possible to suppress occurrence of situations that might cause the shape of positioning surface 47a to change. Note that while there is no objection to arrangement of openings 45b of air holes 45 at inner surface(s) other than positioning surface 47a of recess 47, to suppress occurrence of situations in which contact is accidentally made with positioning surface 47a it is preferred that these be arranged so as to be separated from inner surfaces of recess 47.

As described above, the tread mold 4 of the embodiment that is one among a plurality thereof which may be arrayed in annular fashion in a tire circumferential D3 direction so that an inner circumferential portion 4a thereof is capable of coming in contact with a tread region 13 of a tire 10 to form a closed space at the interior thereof for molding the tire 10 when in a closed mold state, the tread mold 4 comprises: a securable region 44 at an outer circumferential portion 4b thereof which is capable of being secured to a jig 8 at a machining apparatus; and a positioning surface 47a at the outer circumferential portion 4b thereof which is capable of making surface contact with a reference surface 81d at the jig 8 so as to permit positioning to be carried out relative to the jig 8; wherein the positioning surface 47a is arranged so as to face in the tire circumferential direction D3 so as to permit the tread mold 4 to be positioned relative to the jig 8 in the tire circumferential direction D3.

In accordance with such constitution, when securable region(s) 44 at outer circumferential portion 4b are secured to jig 8 of a machining apparatus, positioning surface 47a of outer circumferential portion 4b makes surface contact with reference surface 81d of jig 8. In addition, because positioning surface 47a is arranged so as to face the tire circumferential direction D3, positioning of tread mold 4 relative to jig 8 is carried out in the tire circumferential direction D3. Accordingly, tread mold 4 can be secured in the proper position relative to jig 8 of the machining apparatus.

Further, the tread mold 4 of the embodiment further includes a recess 47 at the outer circumferential portion 4b; and the positioning surface 47a is arranged at an inner surface of the recess 47.

In accordance with such constitution, recess 47 is provided at outer circumferential portion 4b of tread mold 4, and positioning surface 47a is arranged at an inner surface of recess 47. As a result, it will be possible, for example, to suppress occurrence of situations in which other objects come in contact with positioning surface 47a.

Further the tread mold 4 of the embodiment further includes a plurality of air holes 45 extending from openings 45a at the inner circumferential portion 4a to openings 45b at the outer circumferential portion 4b; and all of the openings 45b at the outer circumferential portion 4b are arranged in such fashion as to be separated from the positioning surface 47a.

In accordance with such constitution, a plurality of air holes 45 extend from openings 45a at inner circumferential portion 4a of tread mold 4 to openings 45b at outer circumferential portion 4b thereof. In addition, during maintenance and inspection of tread mold 4, cleaning operations might be carried out, e.g., for removal of debris adhering to openings 45a, 45b. But because all openings 45b at outer circumferential portion 4b are arranged in such fashion as to be separated from positioning surface 47a, it is possible to prevent said procedure from being carried out at positioning surface 47a.

The tread mold 4 and method for repair thereof are not limited to the configuration of the embodiment described above, and the effects are not limited to those described above. It goes without saying that the tread mold 4 and method for repair thereof can be variously modified without departing from the scope of the subject matter of the present invention. For example, the constituents, methods, and the like of various modified examples described below may be arbitrarily selected and employed as the constituents, methods, and the like of the embodiments described above, as a matter of course.

(1) The constitution of tread mold 4 associated with the foregoing embodiment is such that positioning surface 47a is arranged at an inner surface of recess 47. However, while such constitution is preferred, tread mold 4 is not limited to such constitution. For example, it is also possible to adopt a constitution in which positioning surface 47a is arranged at a convexly formed surface.

(2) Furthermore, the constitution of tread mold 4 associated with the foregoing embodiment is such that all openings 45b at outer circumferential portion 4b are arranged in such fashion as to be separated from positioning surface 47a. However, while such constitution is preferred, tread mold 4 is not limited to such constitution. For example, it is also possible to adopt a constitution in which at least one opening 45b at outer circumferential portion 4b is arranged on positioning surface 47a.

(3) Furthermore, the constitution of tread mold 4 associated with the foregoing embodiment is such that positioning surface 47a is planar to accommodate planar reference surface 81d. However, tread mold 4 is not limited to such constitution. For example, it is also possible to adopt a constitution in which positioning surface 47a is concavely curved to accommodate a convexly curved reference surface 81d at jig 8.

Figure 17:
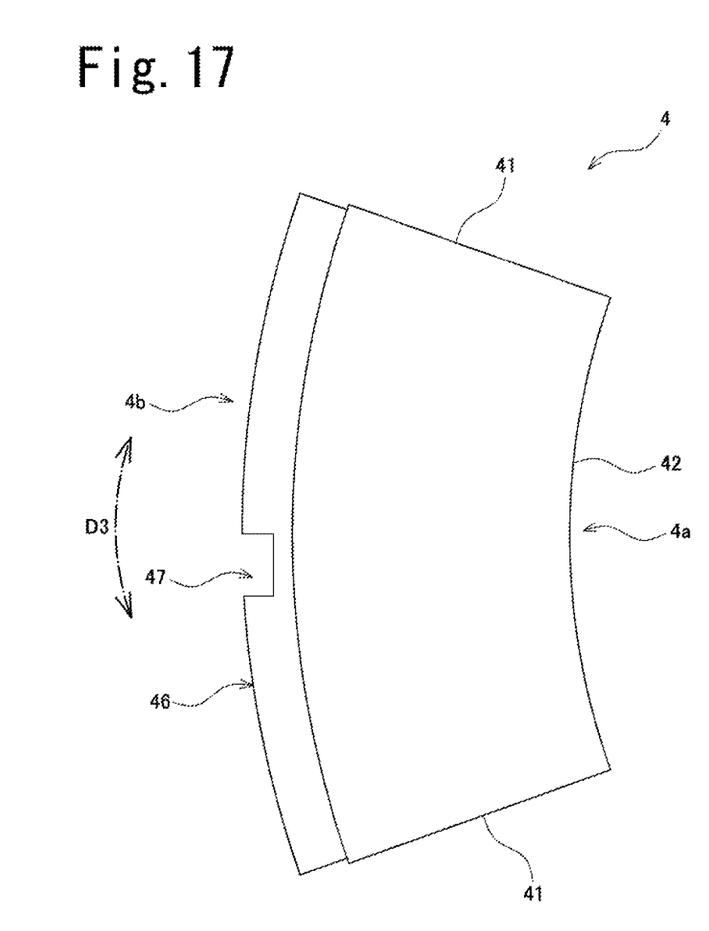
FIG. 17 is a general plan view of a tread mold associated with another embodiment.

(4) Furthermore, the constitution of tread mold 4 associated with the foregoing embodiment is such that ends in the tire circumferential direction D3 are provided with circumferential end faces 43c at nonjoint region 43 which do not wear, and first joint regions 41 which wear. However, tread mold 4 is not limited to such constitution. For example, as shown in FIG. 17, it is also possible to adopt a constitution in which ends in the tire circumferential direction D3 of tread mold 4 are made up of only first joint regions 41 which wear.

At such tread mold 4, in the event that first joint region 41 wears, it will not be possible to identify the position thereof in the tire circumferential direction D3. Accordingly, a constitution in which a positioning surface 47a that makes surface contact with reference surface 81d of jig 8 is provided will be extremely effective at a tread mold 4 in which ends in the tire circumferential direction D3 are made up of only first joint regions 41.

Figure 18:
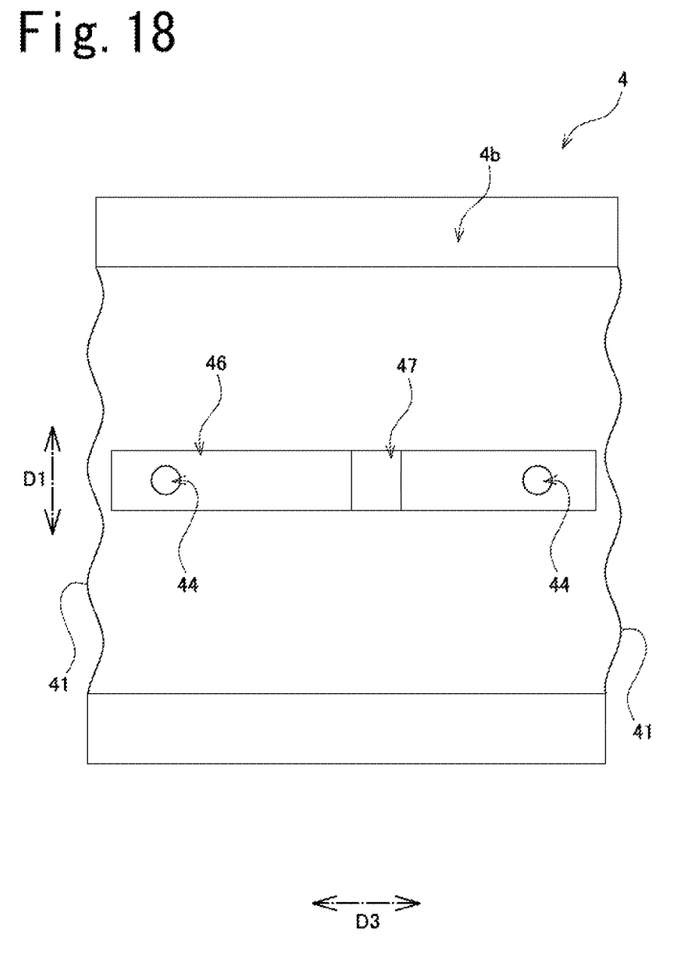
FIG. 18 is a general side view of a tread mold associated with yet another embodiment.

(5) Furthermore, the constitution of tread mold 4 associated with the foregoing embodiment is such that first joint regions 41 are planar. However, tread mold 4 is not limited to such constitution. For example, as shown in FIG. 18, it is also possible to adopt a constitution in which first joint region 41 has irregular surface(s) such as will permit it to engage with first joint region(s) 41 of adjacent tread mold(s) 4.

In particular, at a tread mold 4 in which first joint region 41 has an irregular surface, it is sometimes the case that it is difficult to identify the position thereof in the tire circumferential direction D3 even when first joint region 41 is in its original unworn state. In addition, at such tread mold 4, in the event that first joint region 41 wears, it will be still more difficult to identify the position thereof in the tire circumferential direction D3.

Accordingly, a constitution in which a positioning surface 47a that makes surface contact with reference surface 81d of jig 8 is provided will be extremely effective at a tread mold 4 in which first joint region 41 has an irregular surface. Note that whereas the constitution of the tread mold 4 associated with FIG. 18 is such that ends in the tire circumferential direction D3 are made up of only first joint regions 41, there is no limitation with respect to such constitution, it also being possible to adopt a constitution in which ends in the tire circumferential direction D3 are provided with circumferential end faces 43c at nonjoint region 43 which do not wear, and first joint regions 41 which wear.

The invention claimed is:

1. A tread mold that is one among a plurality thereof which may be arrayed in annular fashion in a tire circumferential direction so that an inner circumferential portion thereof is capable of coming in contact with a tread region of a tire to form a closed space at the interior thereof for molding the tire when in a closed mold state, the tread mold comprising:
- a securable region at an outer circumferential portion thereof which is capable of being secured to a jig at a machining apparatus; and
- a positioning surface at the outer circumferential portion thereof which is capable of making surface contact with a reference surface at the jig so as to permit positioning to be carried out relative to the jig;
- wherein the positioning surface is arranged so as to face in the tire circumferential direction so as to permit the tread mold to be positioned relative to the jig in the tire circumferential direction.

2. The tread mold according to claim 1, further comprising a recess at the outer circumferential portion; and
- the positioning surface is arranged at an inner surface of the recess.

3. The tread mold according to claim 1, further comprising a plurality of air holes extending from openings at the inner circumferential portion to openings at the outer circumferential portion; and
- all of the openings at the outer circumferential portion are arranged in such fashion as to be separated from the positioning surface.

4. The tread mold according to claim 2, further comprising a plurality of air holes extending from openings at the inner circumferential portion to openings at the outer circumferential portion; and
- all of the openings at the outer circumferential portion are arranged in such fashion as to be separated from the inner surface of the recess.

5. The tread mold according to claim 2 wherein surface roughness of the positioning surface is less than surface roughnesses at locations other than the positioning surface at the inner surface of the recess.

6. The tread mold according to claim 1 wherein the positioning surface is planar.

7. The tread mold according to claim 1 further comprising joint regions capable of coming in contact with adjacent tread molds when in the closed mold state, at either end thereof in the tire circumferential direction; and
- the respective joint regions have irregular surfaces.

8. A tread mold repair method comprising:
- preparing the tread mold according to claim 1 wherein provided, at either end thereof in the tire circumferential direction, there are joint regions capable of coming in contact with adjacent tread molds when in the closed mold state;
- causing metal to be built up at the joint regions of the tread mold;
- causing the tread mold to be secured to the jig in such fashion that the positioning surface of the tread mold is in contact with the reference surface at the jig; and
- machining the joint regions of the tread mold using data pertaining to an original shape of the tread mold.

* * * * *